United States Patent [19]  [11]  4,340,572
Ben-Shmuel et al.  [45]  Jul. 20, 1982

[54] PROCESS FOR RECOVERING HEAT FROM STACK OR FLUE GAS

[75] Inventors: Dan Ben-Shmuel, St. Johnsville; Philip Zacuto, Johnstown, both of N.Y.

[73] Assignee: Woodside Construction, Inc., Johnstown, N.Y.

[21] Appl. No.: 907,667

[22] Filed: May 19, 1978

[51] Int. Cl.$^3$ ............................................. C01B 17/00
[52] U.S. Cl. .................................. 423/242; 423/235; 261/151
[58] Field of Search .......... 423/242 A, 242 R, 244 A, 423/244 R, 235; 261/151

[56] References Cited

U.S. PATENT DOCUMENTS

| | | | |
|---|---|---|---|
| 856,048 | 6/1907 | Gaillard | 261/138 |
| 1,083,885 | 1/1914 | Lloyd | 261/138 |
| 1,265,893 | 5/1918 | Eustis | 261/138 |
| 1,985,529 | 1/1935 | Ray | 261/10 |
| 2,090,466 | 8/1937 | Bichowsky | 183/120 |
| 2,878,099 | 3/1959 | Breuing | 23/2 |
| 3,169,575 | 2/1965 | Engalitcheff et al. | 165/1 |
| 3,249,152 | 5/1966 | Buss et al. | 261/151 |
| 3,439,724 | 4/1969 | Mason | 159/13 |
| 3,608,279 | 9/1971 | West | 261/151 |
| 3,652,305 | 1/1972 | Hardison | 423/242 |
| 3,790,660 | 2/1974 | Earl et al. | 423/242 |
| 4,121,541 | 10/1978 | Kneissl et al. | 261/151 |
| 4,129,179 | 12/1978 | Maliton | 261/151 |

Primary Examiner—O. R. Vertiz
Assistant Examiner—Gregory A. Heller
Attorney, Agent, or Firm—Kirschstein, Kirschstein, Ottinger & Cobrin

[57]  ABSTRACT

A method and apparatus for efficiently recovering heat from a gas stream such as discharged flue gas. The gas stream is countercurrently contacted with a liquid medium in two stages. A first countercurrent contact stage is between a partially cooled gas stream and cold liquid medium in a bed of packing through which the cold liquid medium flows downwards and the partially cooled gas stream flows upwards, so that a warmed liquid medium and fully cooled gas stream are produced. The second countercurrent contact stage is between the warmed liquid medium derived from the first contact stage and the hot initial gas stream in a plurality of parallel vertically oriented passages. The warmed liquid medium flows downward on the inner walls of the vertically oriented passages as a thin liquid film, while the hot initial gas stream flows upwards within the vertically oriented passages, so that a fully heated liquid medium and the partially cooled gas stream are produced. The second contact stage accomplishes high direct contact heat transfer with low mass transfer, so that minimal heat is lost as heat of vaporization of liquid medium evaporated into the gas stream. The fully heated liquid medium is passed in indirect heat exchange with a fluid, so that the liquid medium is cooled and the fluid, which may be water, air, or a process fluid stream, is heated.

11 Claims, 9 Drawing Figures

PROCESS FOR RECOVERING HEAT FROM STACK OR FLUE GAS

BACKGROUND OF THE INVENTION

1. Field of the Invention

The recovery of heat, especially moderate temperature level waste heat, from a gas stream containing fouling and/or corrosive constituents.

2. Description of the Prior Art

The recovery of low level previously wasted heat from sources such as flue gas has received attention in recent years because of the energy crisis. The cost of conventional fuels such as oil, coal and especially natural gas has escalated to the point where it is now profitable to install ancillary heat recovery units to recover previously wasted heat contained in plant effluents such as flue gas. The problem of efficiently and usably recovering such heat is compounded by the fact that it is only available at a relatively low temperature level, and in the case of flue gas the sensible and latent heat contained in the gas must be recovered from a large quantity of gas having low heat content. Flue gas produced by burning sulfur containing fuels is of an extremely corrosive nature, especially when the flue gas is scrubbed by aqueous media which generates sulfurous and sulfuric acids in situ. Flue gas usually also has a substantial particulate loading, e.g., dust, soot, fly ash, etc.

Heat recovery schemes of various types are shown in U.S. Pat. Nos. 1,083,885; 1,986,529; 2,090,466; 2,878,099; 3,169,575; 3,439,724 and 3,906,507.

SUMMARY OF THE INVENTION

Purposes of the Invention

It is an object of the present invention to provide a method and apparatus for the efficient and economical recovery of heat.

Another object is to recover heat from low temperature sources in an improved manner.

A further object is to efficiently recover waste heat.

An additional object is to provide a high heat transfer and low mass transfer device and method for the direct contact transfer of heat from a gas to a liquid medium.

Still another object is to recover usable heat from a gas stream.

Another object is to recover previously wasted heat from process gas streams.

Another object is to lower fuel consumption in facilities which generate a hot waste gas stream.

Another object is to aid in alleviating the energy crisis facing the nation.

Another object is to raise the overall thermal efficiency of installations which generate gas streams containing low level heat, i.e., low to moderate temperature gas streams.

Another object is to provide a method and apparatus for recovering usable heat from a gas stream which can be retrofitted to any heating installation burning any type of fuel, either gas, oil, coal, refuse, etc.

Another object is to recover heat previously lost via atmospheric discharge of flue gas through a stack.

Another object is to heat process water, preheat boiler water makeup, preheat air, or heat spaces, or provide moderate temperature heat for any other application, using previously wasted heat which is recovered in an efficient and economical manner.

Another object is to provide a wetted surface contactor which obviates corrosion because the surface is not in contact with corrosive gas.

Another object is to provide a method for cooling, and thereby recovering the heat from, gas which contains a corrosive condensible component, below its dew point, e.g., flue gas with $H_2SO_4$.

Another object is to concomitantly recover heat and purify a waste gas by removal of deleterious components and entrained solids.

Another object is to process gas with very high particulate loadings, such as ling, fibre, soot, ash, etc., without plugging problems, due to the open nature of the internals in the present invention.

Another object is to process gas containing condensible compounds such as resins, gums or plastics for heat recovery, without having the compounds coagulate or stick to surfaces of the unit.

Another object is to recover usable heat from a gas stream using a method and apparatus which produces a low pressure drop resulting in low power consumption and structurally simple equipment.

These and other objects and advantages of the present invention will become evident from the description which follows.

Brief Description of the Invention

In the present invention, the method of recovering usable heat from a gas stream includes countercurrently contacting the gas stream with a liquid medium in two stages. A first contact stage is countercurrently between a partially cooled gas stream and cold liquid medium, whereby a warmed liquid medium and fully cooled gas stream are produced. A second contact stage is countercurrently between the warmed liquid medium derived from the first contact stage and the hot initial gas stream, whereby a fully heated liquid medium and the partially cooled gas stream are produced. The first contact stage is a bed of packing, typically spherical, ring or saddles type packing, through which the cold liquid medium flows downwards and the partially cooled gas stream flows upwards. The second contact stage is a plurality of parallel vertically oriented passages. The warmed liquid medium flows downwards on the inner walls of the vertically oriented passages as a thin liquid film, and the hot initial gas stream flows upwards within the vertically oriented passages in direct contact heat exchange with the downflowing films of liquid medium, so that high heat transfer is accomplished with low mass transfer, i.e., a relatively low rate of vaporization of the liquid medium into the gas stream which results in low consumption of heat as latent heat of vaporization.

In the apparatus aspect of the present invention, the apparatus for recovering usable heat from a gas stream includes a generally horizontal bed of packing, which packing bed is disposed in a first container. A plurality of vertically oriented ducts are provided in juxtaposed relationship in a second container.

With regard to the bed of packing, means are provided to disperse a cold liquid medium downwards onto the bed, so that the cold liquid medium flows downwards through the bed of packing. Means are provided to pass a partially cooled gas stream upwards through the bed of packing, so that a warmed liquid medium is discharged below the bed of packing and a fully cooled gas stream is discharged above the bed of packing. Means are provided to remove the fully cooled gas stream from the upper part of the first container, and means are provided to pass the warmed liquid medium from the lower part of the first container into the upper part of the second container.

With regard to the second container containing the ducts, means are provided in the upper part of the second container to disperse the warmed liquid medium downwards into the ducts, so that the warmed liquid medium flows downwards on the inner walls of the ducts as a thin liquid film. Means are provided to pass the initial hot gas stream into the second container below the ducts, so that the initial hot gas stream flows upwards through the ducts and is cooled to form the partially cooled gas stream. Means are provided to pass the partially cooled gas stream from the upper part of the second container into the first container below the bed of packing, and means are provided to remove a fully heated liquid medium from the lower part of the second container. The liquid medium is sprayed at the top of the ducts, causing a scrubbing and partial cleansing of the gas prior to its entry into the packed bed.

With regard to preferred embodiments of the invention, the fully heated liquid medium is typically passed in indirect heat exchange with a fluid, so that the liquid medium is cooled to form the cold liquid medium and the fluid is heated. The fluid may be water, e.g., process water, potable water, boiler feed water, etc., or air, e.g., air for space heating or to support combustion, or any other suitable fluid such as a process stream, either liquid or gaseous.

The first and second contact stages disposed, respectively, in the first and second containers, may be juxtaposed side-by-side. Alternatively, the first contact stage may be disposed above the second contact stage. In this latter instance, both the first and second contact stages may be disposed in a single container or vessel.

The vertically oriented passages or ducts will typically have a regular polygonal cross-section, e.g., hexagonal, and the passages or ducts will usually be aligned side-by-side in a honeycomb.

The liquid medium typically comprises water, i.e., water per se or an aqueous solution or slurry. When the gas stream contains sulfur dioxide, e.g., when the gas stream is a waste stack or flue gas derived from the combustion of a sulfur-containing fuel, the liquid medium will typically be water containing an alkaline agent or medium which removes the sulfur dioxide from the gas stream and thus prevents air pollution. Thus in a preferred embodiment the aqueous liquid medium is an aqueous solution containing a dissolved alkaline medium such as the hydroxide, sulfite or carbonate of sodium, potassium, lithium or ammonia, or an aqueous slurry containing an entrained alkaline medium such as the hydroxide, sulfite or carbonate of magnesium, calcium or barium.

With regard to the apparatus aspects of the invention, in a preferred embodiment the means in the upper part of the second container to disperse the warmed liquid medium downwards into the ducts is a plurality of spray nozzles juxtaposed in a common horizontal plane. Baffle means will usually be provided in the second container below the ducts, so that the initial hot gas stream is uniformly distributed into the ducts. Typically the means to remove the fully cooled gas stream from the upper part of the first container will include an entrainment separation means disposed in the first container above the bed of packing, a stack extending upwards from an opening in the top of the first container, and an induced draft fan which is disposed in the stack adjacent the top of the first container. Similarly, an entrainment separation means will usually be provided in the upper portion of the second container, above the means in the upper part of the second container to disperse warmed liquid medium downwards into the ducts. This entrainment separation means may be a means provided with a plurality of baffles, e.g., of the chevron type, or a packed bed.

The present heat extractor method and apparatus is primarily directed to the recovery of previously wasted heat from flue gas. Thus the heat extractor is a flue gas heat recovery device and method which has proven itself in plant service and is producing outstanding fuel savings. The otherwise wasted heat contained in the discharged combustion gases is recovered for use rather than lost through the stack. The heat extractor can be retrofitted to any heating installation burning any type of fuel, either gas, oil, coal, refuse, etc. With this recovery, the overall thermal efficiency of the installation will be raised to greater than 95%. This increase will be reflected in significantly lower fuel consumption.

The heat extractor principle, in summary, employs a direct contact heat transfer scheme to remove the heat from the hot flue gas. A working liquid solution is placed in direct contact with the hot flue gas. It is subsequently put into thermal contact with the process fluid to be heated, using a modified design shell and tube heat exchanger. In this manner, the heat transfer from the hot flue gas to the cold process fluid is effected. The cooled flue gas is finally discharged through a stack at a temperature of approximately 90° F. An induced draft booster fan is employed to compensate for the pressure drop encountered in the unit.

An important characteristic of this process for flue gas heat transfer is the feasibility of lowering the flue gas temperature far below its dew point. The sulfur based acids condensed by the cooling process are diluted to concentrations of less than 0.5% in the working liquid solution. At these concentrations, the answer to the problem of corrosion prevention is reduced to readily available chemical handling procedures. Cold-end corrosion, ordinarily encountered at temperatures below the flue gas dew point, is nonexistent due to the present unique method of flue gas cooling.

For the majority of heating installations, either boilers, independently fired hot water heaters, or air heaters, the recovery rate will be 17%–25% of the output, for flue gas temperatures from 300° F. to 800° F. The savings apply to boilers burning oil or natural gas. Other applications include dryers, ovens, kilns, singeing burners, heat setting units, etc. In these cases very little heat is removed by the process and therefore virtually all of the heat input is lost through the stack. The present heat extractor method and apparatus will recover this heat, resulting in savings amounting to almost the total heat input. In many plants this can permit the removal of existing water or air heaters by substituting the recovered energy as the heat source.

In the most common application, the recovered heat is transferred to incoming cold water, thereby warming it before it is heated to its working temperature and used for process. For plants where the use of hot process water is high, the heat extractor will produce the most dramatic savings. In addition to saving fuel by recovering otherwise wasted heat, the capacity of the installation to produce hot water is greatly increased. Such an increase in general is sufficient to relieve strains caused by peak demand. Other applications include the preheating of boiler makeup, space heating, air preheating, or any situation where moderate temperature heat is required. It is possible to tailor the system to combine different applications. An example of this frequently encountered is the further heating of already preheated process water, as from existing heat recovery equipment, combined with the heating of incoming cold boiler makeup water. This sort of recovery optimization is rapidly becoming a necessity as the cost of energy increases.

The use of the second contact stage consisting of the plurality of passages or ducts provides a contact device having a high heat transfer to mass transfer ratio. High heat transfer is desired with low mass transfer, i.e., when vapor is evolved, heat is consumed and wasted as latent heat of vaporization of the vapor which becomes entrained in the gas stream. Hence, it is desirable to minimize mass transfer. In other words, there is competition between the heating of the water and the production of vapor. The heat must go to the former. This is accomplished by direct contact through the envelope of the thin liquid films on the inner surfaces of the vertical passages, i.e., the ducts, in the second contact stage (the second container). Without this device, the outlet temperature of the liquid medium will be thermodynamically limited to the range of 130° F.–150° F. The present arrangement will allow outlet temperatures significantly higher. The present device and method is thus used for the reclamation of waste heat and specifically for its subsequent transfer to yet another medium by means of a recuperative heat exchanger. It is the fact that the heat must be transferred to a final medium from the working liquid that necessitates the highest possible liquid outlet temperature.

The features and other advantages of the present type of heat transfer device and method will not be outlined. Because of the wetted surfaces, corrosion is obviated. The surface is not in contact with the very corrosive gas and the liquid can be chemically treated if desired. Gas with very high particulate loadings (ling, fibre, soot, ash, etc.) can be processed without plugging problems due to the open nature of the internals. Gas with condensible compounds which might coagulate or stick (resins, gums, plastics, etc.) can be processed. These will condense on the surface of the liquid and be carried off. If they do condense on the inner surfaces of the passages, in general this will not be a problem, again due to the large opening available. The present device is excellent as a direct contact heat transfer device for the water, gas system due to the high heat transfer to mass transfer ratio inherent in this contact. The primary reason for this is the poor surface regeneration that falling films exhibit. The top sprays will serve as an efficient condensation mechanism for the exiting gas. In this regard, by using sprays of various spray angles, this device will also perform the function of allowing countercurrent flow of the gas with the spray. This occurs due to the inability of the gas and/or spray droplets to swirl and hence mix, which would lead to a single stage contacting. The same advantages of non-plugging design still pertain. The top sprays will remove a very large fraction, typically about 90%, of the larger and plugging-causing entrained particulates. This allows the gas to be subsequently treated by other mechanisms such as a packed tower, bag filters, etc. The present contacting device produces a low pressure drop resulting in low power consumption and structurally simpler equipment.

In summary, the method used for heat recovery in the present invention is the direct contacting of a working liquid with the hot gas. This contact is made in countercurrent flow so that the greatest temperature approach can be achieved. The liquid will usually be a water solution, with the solute chosen on the basis of the chemistry encountered in the particular installation.

The object of the device is twofold. First, to recover heat at the highest possible temperature, viz., to heat the liquid to the highest temperature allowed in this thermodynamic system. Second, to permit the scrubbing of the gas to remove both particulate, e.g., dust, ash, mist, etc., and gaseous contaminants.

At the hot gas inlet, liquid outlet end (second contact stage), a high heat transfer to mass transfer ratio contacting device is employed to minimize the vaporization of water used in the contacting. Such mass transfer would result in the heat absorbed from the gas going to latent heat of vaporization rather than to sensible heat of the liquid, thereby diminishing the increase in its bulk temperature. The device in the second conact stage basically consists of a parallel group of peripheral falling liquid film, rising gas core contactors in a countercurrent arrangement within a vertical cylinder or a vertical cylindrical annulus. This allows for the high heat transfer rate relative to the mass transfer rate. As such the outlet water temperature is high. This stage will transfer about 25% to 30% of the available heat in the gas. The remainder will be transferred in the subsequent contacting regions. The liquid is distributed at the tops of the cylinders by a series of spray nozzles. The liquid is supplied by a pump, the suction end of which receives liquid from the prior contacting.

The spraying contact in the second contact stage passages or ducts will entrain and remove most of the coarser ash and dust particles in the gas. This removal eliminates the possibility of the larger particles agglomerating within the packing region (first stage) and causing a restriction in the free flow area. The gas next enters the bottom of the packed tower contacting region. The liquid in this region originates as cold spray at the top of this tower. The gas is in countercurrent flow with the liquid. The remainder of the heat is transferred, while at the same time a conventional packed tower scrubbing action takes place. This causes the removal of the finer dust particles, mists and gaseous contaminants. If the liquid is properly doped, e.g., if a suitable alkaline additive is present in the liquid, then it can be used to remove a particular gas, e.g., sulfur dioxide. Typically, any basic additive can be used for the removal of SOx.

The final contact is between the cooled gas and the cold liquid inlet spray. This will condense and cool the gas down to within a few degrees of the inlet liquid temperature. The cold gas is now discharged to the atmosphere.

The net result is the transfer of all the available heat of the gas, both sensible and latent heat of the water vapor it contains, the heating of the liquid to as high a temperature as possible and the scrubbing of the gas.

The invention, accordingly, consists in the features of construction, combination of elements, arrangement of parts, and series of steps which will be exemplified in the method and apparatus hereinafter described and of which the scope of application will be indicated in the appended claims.

DETAILED DESCRIPTION OF THE PREFERRED EMBODIMENTS

Figure 1:
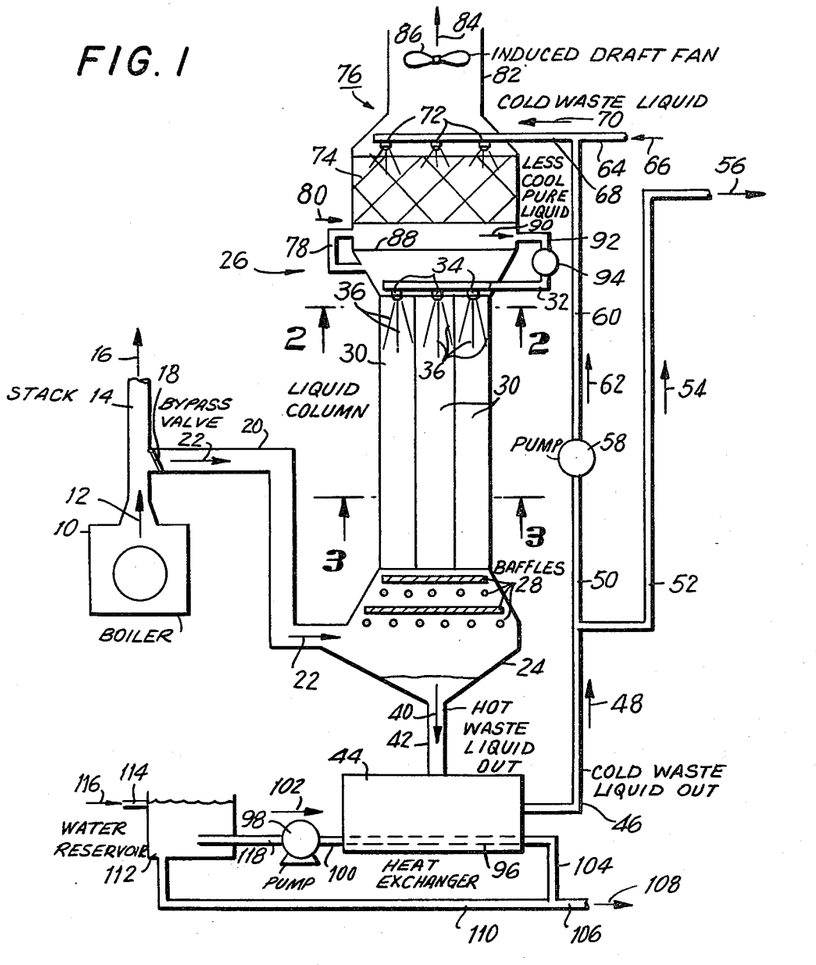
FIG. 1 is a sectional elevation view of one embodiment of the invention.
Figure 2:
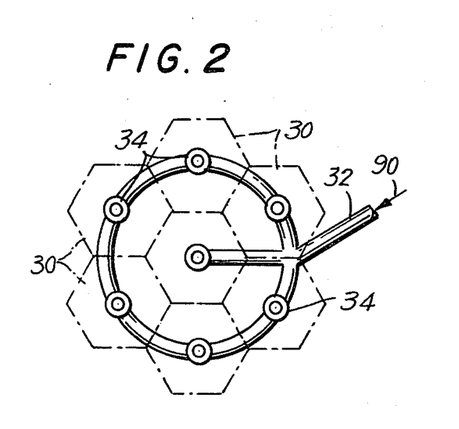
FIG. 2 is a bottom plan view taken substantially along the line 2—2 of FIG. 1.
Figure 3:
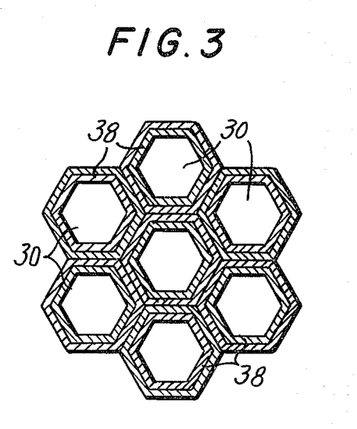
FIG. 3 is a bottom plan view taken substantially along the line 3—3 of FIG. 1.

Referring now to FIGS. 1, 2 and 3, a source 10 of waste flue or stack gas is shown. The source 10 in this embodiment of the invention is a steam boiler which burns a fuel with air in order to generate steam. The combustion process evolves a waste flue gas stream 12 which, without any arrangement for scrubbing and/or heat recovery, would be passed via stack 14 to atmospheric discharge via stream 16. Typically, stream 12 principally contains nitrogen, carbon dioxide, and residual unreacted oxygen, and in instances when the fuel burned in unit 10 contains sulfur, the gas stream 10 will also contain a small proportion of sulfur dioxide and a lesser proportion of sulfur trioxide. Stream 10 in many instances will also contain a viable small proportion of entrained solid particles, e.g., soot, fly ash, etc. Typically, stream 12 is generated at a temperature in the range of about 150° C. to about 300° C.

In accordance with the present invention, stream 12, instead of discharge via stream 16, is passed via valve 18, shown closed but normally open, through duct or conduit 20 via stream 22 for processing in accordance with the present invention. Stream 22 flows from duct 20 into the lower portion 24 of heat extractor 26, which is of a configuration in accordance with the present invention. Lower portion 24 of the heat extractor 26 contains a plurality of spaced apart parallel horizontal bars 28, which are arranged in parallel rows so as to act as a baffle and thereby to evenly disperse gas stream 22 into the plurality of parallel vertically oriented gas passages 30, which extend upwards from section 24.

Pipe 32 above gas passages 30 conducts a liquid medium to spray nozzles 34, each of which is oriented at the upper end of one of the passages 30. The liquid medium, in this case an aqueous solution, is typically discharged from spray nozzles 34 at a temperature in the range of about 40° C. to about 80° C. The sprayed liquid droplets streams 36 discharged from spray nozzles 34 descend through passages 30 and impinge on the walls of the passages 30, so that a thin liquid film 38 (FIG. 3) flows downwards on the inner surfaces of each of the hexagonal gas passages 30. The descending films 38 pass into section 24 and coalesce into a body of warmed liquid medium, now typically at a temperature in the range of about 60° C. to 95° C. A stream 40 of warmed liquid medium is removed from the bottom of section 24 via pipe 42, which conducts stream 40 into heat exchanger 44. The stream 40 is cooled in unit 44, typically to a temperature in the range of about 45° C. to about 85° C. The cooled liquid medium is removed from unit 44 via pipe or duct 46 and flows upwards as indicated by arrow 48. Pipe 46 divides into recycle pipe 50 and tapoff pipe 52. Cooled liquid medium flows via pipe 52 as indicated by arrow 54 to discharge via stream 56, which in the case of water scrubbing of flue gas may be discharged to a sewer or the like to prevent buildup of entrained solid particles in the scrubbing liquid. In instances when the hot waste gas contains sulfur dioxide and the liquid medium is an aqueous alkaline solution or slurry, stream 56 may be processed in means not shown for sulfur dioxide evolution in a concentrated form for recovery and regeneration of the alkaline scrubbing medium.

The recycle liquid medium flows via pipe 50 through pump 58 and pipe 60 upwards in the direction indicated by arrow 62. A pipe 64 adds makeup liquid medium stream 66 to the upflowing liquid medium in pipe 60, and the resultant combined liquid medium stream flows via pipe 68, as indicated by arrow 70, to discharge via spray nozzles 72 downwardly into upper packed bed 74 disposed within upper section 76 of the heat extractor 26. The liquid medium flows downwards through bed 74 and further cools and scrubs the rising gas phase, which is admitted into section 76 below bed 74 via duct or conduit 78. The duct 78 receives rising partially cooled and scrubbed gas from above passages 30, and duct 78 passes the gas as indicated by arrow 80 into section 76. The rising gas discharged above bed 74 now flows to atmospheric discharge or the like via stack 82 as stream 84, which stream 84 is induced to flow by fan 86.

Division of fluid flow between section 76 and lower gas passages 30 is accomplished by the provision of a partition 88, which diverts uprising gas to duct 78 and concomitantly directs downflowing liquid medium below bed 74 laterally as indicated by arrow 90. Liquid stream 90 passes via pipe 92 and pump 94 to pipe 32.

Referring now to the lower portion of FIG. 1, piping, tubing or duct 96 in heat exchanger 44 receives a fluid stream from pump 98 via pipe 100; fluid flow is in the direction indicated by arrow 102. The fluid passing through pipe 100 may be air, water, a process fluid, or the like. In any event, the fluid is heated from a lower temperature to a higher temperature typically in the range of about 50° C. to about 90° C., by indirect heat exchange with the hot liquid medium stream 40, the point value of the temperature depending on various factors such as relative flow rates, heat exchange surface, whether countercurrent or cocurrent flow is adopted, etc., all of which is well known to those skilled in the art. The resultant heated fluid stream is removed from element 96 via pipe 104. A portion of the heated fluid stream is removed from pipe 104 via tapoff pipe 106 and passed via stream 108 to utilization, as described supra. The balance of the heated fluid stream flows via pipe 110 to reservoir 112, in which it is joined by makeup fluid, in this case liquid, admitted to reservoir 112 via pipe 114 as stream 116. A feed portion stream of liquid to be passed to the indirect heat exchange in unit 44 is tapped off from reservoir 112 via pipe 118 which passes the liquid to pump 98.

Figures 4, 5:
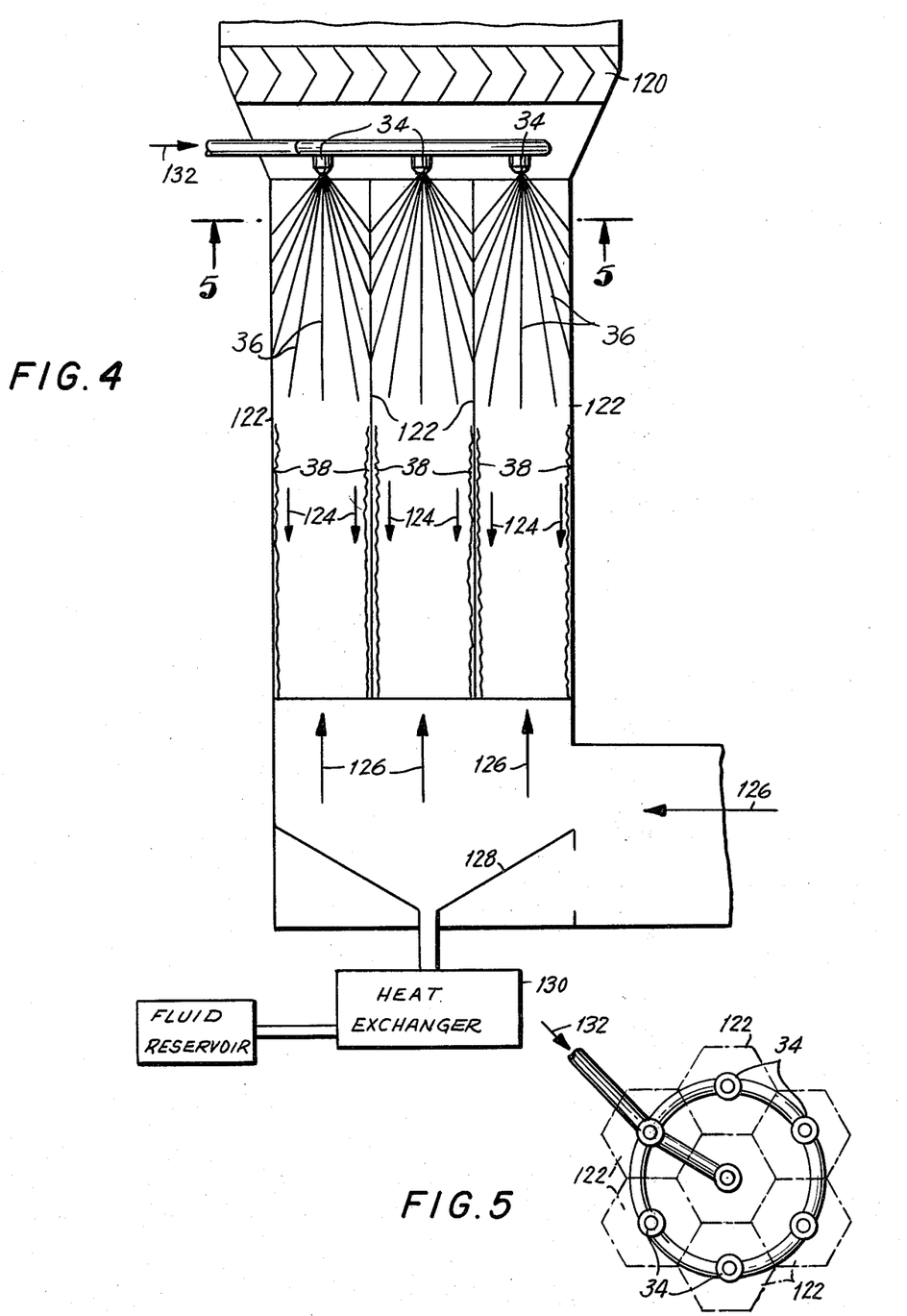
FIG. 4 is a sectional elevation view of an alternative embodiment of the invention.
FIG. 5 is a bottom plan view taken substantially along the line 5—5 of FIG. 4.

Referring now to FIGS. 4 and 5, a configuration similar to FIGS. 1, 2 and 3 is shown, except that a chevron type of entrainment separator 120 is provided in the unit above the spray nozzles. FIG. 4 shows the films of liquid medium 38 in the form of a liquid envelope flowing downwards on the vertical walls 122 of the honeycomb contactor in the direction indicated by arrows 124. An upflowing gas core exists within each honeycomb passage of the contactor; these passages being defined by the walls 122. Because of the present configuration including a central rising gas core and peripheral liquid envelope films 38, evaporative cooling of the liquid phase into the gas phase is inhibited and there is high heat transfer relative to mass transfer. The sprays 36 provide a pre-cleaning by impaction and condensation of water vapor from the gas stream. The impact hot gas stream 126 in this embodiment of the invention may be a moist gas containing entrained acid mist, which is corrosive, such as the tail gas from a sulfuric acid facility in which a sulfur-trioxide containing process gas stream is scrubbed with oleum or concentrated sulfuric acid to absorb the sulfur trioxide and form further oleum or sulfuric acid. In this case the tail gas will contain, in addition to droplets of acid mist, gaseous sulfur trioxide and sulfur dioxide which are also corrosive either per se or when absorbed in aqueous media. The presence of the water envelope films 38 inhibits corrosion of the walls 122. In other instances stream 126 may contain condensable resins entrained as solid particulate material or as vapors at 100° C. to 300° C. Such gummy materials such as resins, or other particulates such as lint, tend to plug many devices or process units in which they are channeled, however in the present configuration, condensing of vapors and pickup of solids particles by the liquid medium takes place off of the walls 122 due to the presence of the liquid films 38 which form a water envelope. The downflowing heated liquid medium is collected below the honeycomb passages by lower funnel 128 and passed to heat exchanger 130 for cooling by indirect heat exchange as described supra. The cooled liquid medium is recycled from unit 130 as stream 132.

Figure 6:
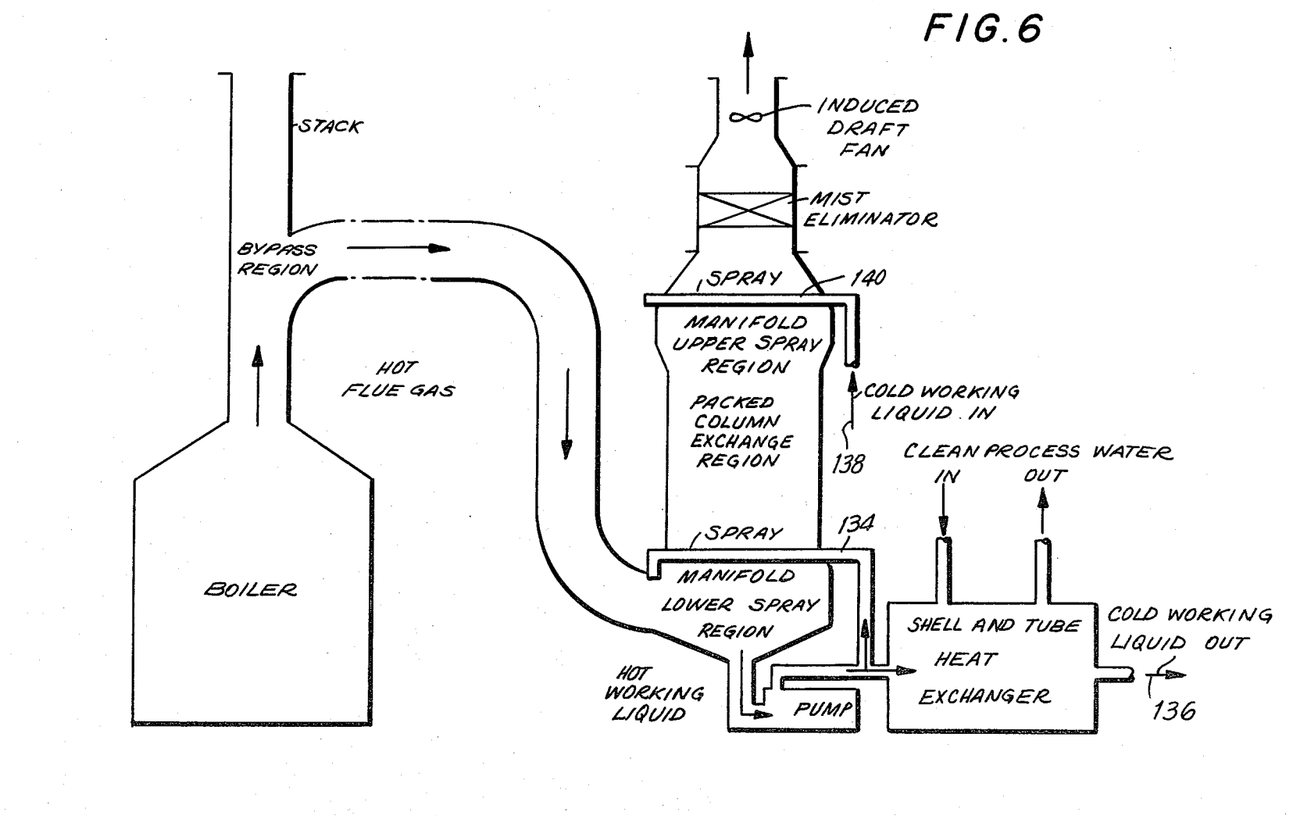
FIG. 6 is a sectional elevation view of still another alternative embodiment of the invention.

Referring now to FIG. 6, an alternative embodiment of the invention is shown. The heat recovery unit as installed includes a bypass at the boiler stack which allows for passage of the gas through the existing stack or through the recovery unit. The pump delivers the hot working liquid both to the initial contact lower spray region, via lower spray manifold 134, and for final transfer to the heat exchanger. The spent cold working liquid stream 136 may be recirculated via stream 138 to upper spray manifold 140, or may be discharged directly. Thus, FIG. 6 illustrates both a hot liquid medium spray manifold 134 in the lower spray region and a cold liquid medium spray manifold 140 in the upper spray region.

Figure 7:
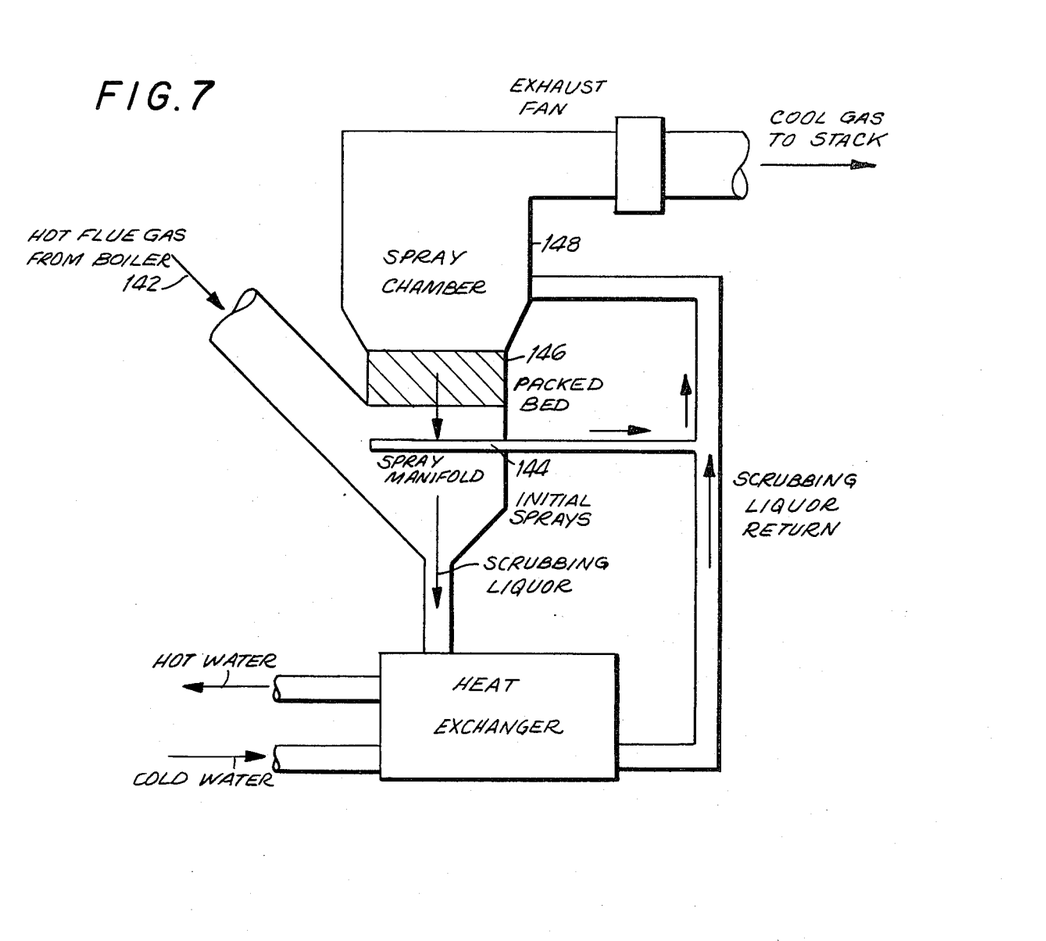
FIG. 7 is a sectional elevation view of still another alternative embodiment of the invention.

FIG. 7 illustrates another alternative embodiment of the invention. In FIG. 7, the hot flue gas stream 142 from the boiler is a dirty gas containing soot, etc., and the initial sprays from manifold 144 take the clogging materials such as soot, etc., out of the gas. It is not necessary to fully scrub the gas at this stage, all that is necessary is to remove large particles which would clog the packed bed 146. This packed bed 146 is a standard bed as generally used for mass transfer operations; the upper spray chamber 148 is of standard construction for even distribution of the working fluid (scrubbing liquid return).

Figure 8:
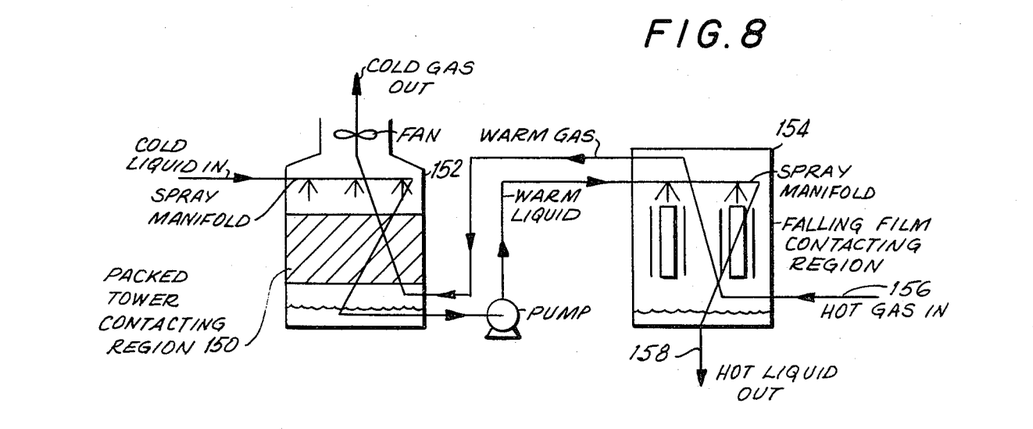
FIG. 8 is a flow diagram of the invention.

FIG. 8 shows a preferred embodiment of the invention which is similar to the FIG. 1 configuration, except that the packed tower contacting region 150 is in a separate container 152. The contacting device 154 features a high heat transfer to mass transfer ratio; minimal vaporization and a partial cleansing of the hot gas stream 156. The stream 156 typically is at an initial temperature in the range of about 200° C. to about 600° C., and the hot liquid discharged via stream 158 is typically at a temperature in the range of about 50° C. to 95° C. It will be appreciated that if stream 158 is other than an aqueous media, e.g., a hydrocarbon fraction or the like, then stream 158 may be at a somewhat higher temperature, e.g., up to about 150° C.

Figure 9:
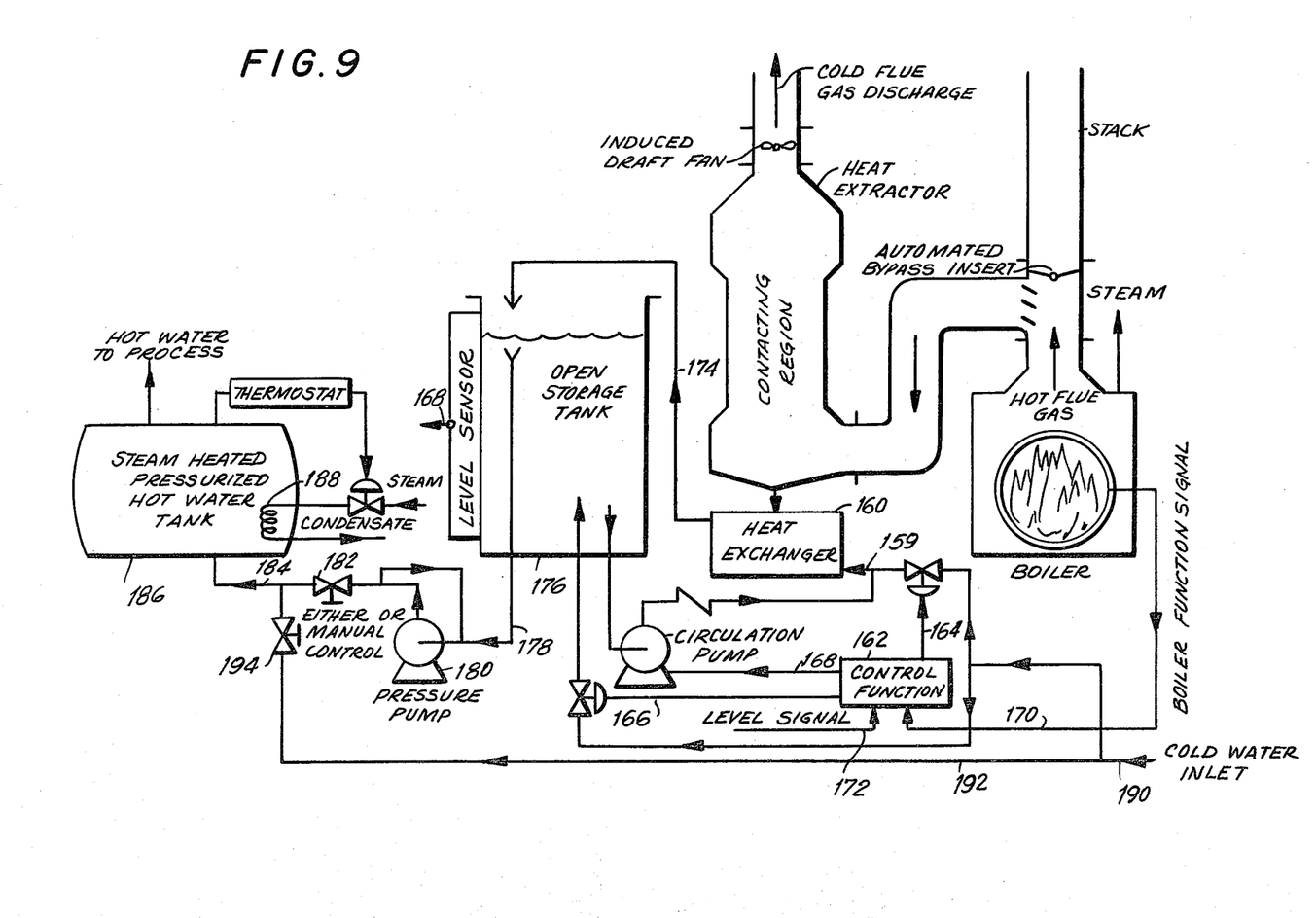
FIG. 9 is a flow diagram of another embodiment of the invention.

FIG. 9 is a flowsheet showing a preferred embodiment of the invention. The process scheme of FIG. 9 entails the heating of process water stream 159 for use in a factory such as a pulp and paper facility, a textile mill, a tannery or a laundering plant. Alternatively, the water being heated may be potable water for residential or hospital use, in food processing plants, etc. The water being heated may also be boiler makeup, for situations where condensate return is not feasible. In another alternative instance, the process fluid being heated by indirect heat exchange in unit 160 may be air, e.g., secondary air for combustion usage in any combustion process or makeup air for space heating, air drying, etc. In FIG. 9, the control function 162 controls flow rates via lines 164, 166 and 168, which may be pneumatic, electrical or mechanical controls, and function 162 receives signals via sensors 170 and 172. The hot process water being heated in unit 160 flows via stream 174 to storage tank 176 and thence via stream 178, pump 180, open valve 182 and stream 184 to hot water storage tank 186. During time periods when stream 174 is not being generated or is generated at an insufficiently high temperature, the steam coil 188 in tank 186 serves to heat the water, which may be admitted as cold water via streams 190 and 192 and valve 194.

Examples of industrial application and process considerations will now be described.

EXAMPLE I

At present, the heat extractor unit can best be used in larger installations with recoverable heat in excess of 500 KBTU/hr. This would correspond to a typical 100 H.P. boiler. In general, for a properly functioning heat generating unit with a typical flue gas temperature of about 250° C., the recoverable heat is 15%–20% of the gross heat input when the flue gas is cooled to about 60° C.

In a mass production facility, the cost is lowered sufficiently so that it is economic to retrofit the unit to small residential size heating installations with gross inputs in the range of a few hundred KBTU/hr. The need for this lower grade heat in sufficient quantities must be present. This will occur when a sufficiently cool heat sink is available as with the mains, river or well water encountered in applications requiring hot water. As an example, in the tanning industry, the typical fuel and hot water consumption is such that recovered heat can supply $\frac{1}{3}$ of the energy required for hot water production. This factor will vary depending on the application and in some cases the time of year. To cite another example, in residential hot water applications, the fraction can vary from 1/5 to 1. As discussed supra, another aspect of the unit is its ability to remove various pollutants from the discharged gas. It will remove essentially all particulate matter above the 1 micron size. It has the capacity to remove chemical pollutants, e.g., sulfur oxides removal using an alkaline liquid medium, and can be tailored to suit a particular removal situation.

Units installed on package boilers burning #6 oil an installed, respectively, in a commercial laundry, a tannery, and a food processing plant, had the following specifications:

TABLE I

| Size of Boiler/ Gross heat input | Heat recovered/ Fuel equivalent |
|---|---|
| 300 H.P./ 12 MBTU/hr. | 1.5 MBTU/hr./ 10 gal./hr. |
| 100 H.P./ 4 MBTU/hr. | 500 KBTU/hr./ 3 gal./hr. |
| 1200 H.P./ 28 MBTU/hr. | 3.6 MBTU/hr./ 25 gal./hr. |

In all cases, the recovered heat is used to warm cold water prior to its entry into existing water heaters.

Prior art methods of recovering heat in similar installations are the use of heat exchanger tubes placed directly in the stream of the hot gas and the rotating regenerator. The disadvantages of these devices are:

1. When the fuel burned contains sulfur, the final outlet temperature of the gas must be in excess of about 130° C., in order to prevent the condensation of concentrated sulfuric acid and the severe corrosion which follows. This, therefore, limits the amount of heat which can be recovered. Given a heat sink at 5° C. to 20° C., this is a severe drawback.

2. When the fuel is oil, coal, wood, bagasse, etc., the collection of particulates can cause blockages in the flue and recovery unit leading to system failure. In addition, even a small amount of deposition can cause a pronounced reduction in the already low heat transfer coefficient, requiring very large installations.

Many "tube in stack" types of prior art heat recovery units have been installed in gas fired boilers. They have performed well. Natural gas, with its low C/H ratio, produces a high water vapor non-corrosive flue gas. This permits the presence of cold metal surfaces in the flue. The need for a unit capable of handling oil and coal, currently the preferred fuels, motivated the development of the present heat extractor, in which heat is recovered from the hot gas by the direct contact between the gas and a working liquid, typically water. The contact, as discussed supra, is so designed in terms of area, volume and mass flow rates so that all the economically available heat is transferred from the gas to the liquid. The constraint of size vs. thermodynamically available heat of course applies.

In accordance with the present invention, the liquid temperature can be raised close to the boiling point, since the inlet gas temperatures are generally in excess of 250° C., and the outlet gas temperature lowered to close to the inlet liquid temperature. This type of temperature approach depends on achieving a nearly perfect countercurrent flow between the gas and the liquid. To achieve this countercurrent flow, a number of different arrangements can be used. The arrangement of perhaps the greatest interest, in accordance with the present invention, is the use of stationary packing in a vertical cylinder, per FIG. 6. In this manner, the hot gas can move upward due to pressure differential, while the liquid moves downward due to gravity. As shown in FIG. 6, used in conjunction with this is a preliminary spraying region contacting the hot gas entering the unit. This serves the dual purpose of both humidifying the gas and removing, by impaction, the coarser particulates. The effect of this is to drastically increase the efficiency of heat transfer.

Although the LMTD is significantly lowered, the average overall heat transfer coefficient is greatly increased due to the presence of a condensable gas, namely water vapor, of significant partial pressure in the noncondensable gases, namely nitrogen, carbon dioxide, etc. Since the gas has been cooled, any natural draft which may have existed has been lost. Similarly, the forced draft produced prior to the firebox by the secondary air fan will be diminished to some degree due to the pressure drop in the contacting region. Therefore, an induced draft booster fan is used on the unit at the point where the cooled gas is discharged to the atmosphere.

In general, the greater the pressure drop for the gas, i.e., the pressure differential between inlet and outlet, the more nearly perfect the countercurrent flow. This, however, must be balanced against the power and installation costs for the induced draft fan. The achievement of the countercurrent flow is highly important, since the direct contact scheme in a mixed or cocurrent flow would lead to severe heat loss due to humidification and subsequent vapor loss. In addition, the two fluids outlet temperatures would be nearly equal causing competition between such losses and subsequent heat transfer efficiency.

Given that in general the heat sink will be in the neighborhood or range of about 5° C. to 20° C., the outlet gas temperature will be less than about 30° C. This is ideal since at this temperature the absolute humidity of the saturated gas is about 25%, a reduction by as much as about 80% from the absolute humidity of the entering hot gas. Furthermore, the slope of the absolute humidity vs. temperature curve increases rapidly from this point. Therefore, the outlet gas temperature must be as low as is possible.

There are other methods within the scope of the present invention for realiziing effective countercurrent flow, such as multicomponent contacting, falling films, baffle trays, etc. These provide alternative recovery methods, each with its own special features and advantages. To cite an example, for cases where the gas is particularly dirty or contains very high levels of pollutants, a multicompartment arrangement would provide for the high liquid to gas ratio desirable in such a situation.

For service in situations where the flue gas contains corrosive constituents, e.g., sulfur dioxide, sulfur trioxide, the direct contacting scheme of the present invention produces a steady state situation with an equilibrium solution concentration of that constituent. If the working liquid is used for a single pass, the concentration will be low; if the liquid is partially recirculated, it will be higher. As an example, when #6 oil with 2% S is burned, and the liquid is not recirculated, the concentration of sulfurous and sulfuric acids with be 0.25% max., with a min. pH of 4.0. With total recirculation, the working liquid must be treated on a continuous basis, e.g., by passing it through a limestone bed, to remove the sulfite and sulfate ions. This will produce an acceptable and neutral residue composed essentially of carbon particles and calcium sulfate. When the working liquid is spent process water from the factory of plant, the need for continuous treatment or fresh water supply is obviated and operational costs are reduced.

The majority of units have been installed on boilers where the firing rate varies with a dynamic range of 2:1.

This results in an induced draft requirement with a range of 4:1 and power 8:1. At present, the heat recovery units operate at the same setting irrespective of the firing rate. Although there is no resulting loss of heat, it is more conservative of energy if a form of active optimization capability is developed. This involves and entails the modulation of the fan load, the working liquid flow rate, pumping rates, etc. Two avenues of approach may be mentioned. The first is the direct electromechanical interaction between the elements of the unit and the circuits on the firing rate, or modulation control. The second involves the use of sensing transducers, active elements and the existing controls in conjunction with on line decision-making circuitry. For larger, more complex systems, microprocessors are indicated. This approach has the added advantage of permitting control of the unit independent of the firing rate. Such controls can be added to an existing unit for which ample operating data is available, and an evaluation made on the basis of the results.

An integral component of the unit is the indirect heat exchanger used for the final transfer of heat from the hot working liquid to fluid to be heated. At this point, the working liquid will have been cooled and will be ready for either recirculation or discharge.

The installed units can be made entirely of stainless steel, which is satisfactory except in the situation where condensation can take place on metallic surfaces. In addition, there is a requirement that the unit be impervious to any flue gas contaminant. Therefore, the recommended material of construction is all fiberglass reinforced plastic (FRP), typically a resin base material such as Hetron-197. If, for example, the heat recovery unit is used in conjunction with an installation burning chlorine containing compounds, e.g., chlorinated organics, plastics such as polyvinyl chloride, solvents, ocean debris, etc., then except for the economically prohibitive superalloys, FRP is the preferred material for usage as the material of construction. This will apply to incinerator installed recovery units where the concentration of chlorides may be as high as 3000 p.p.m. due primarily to packing materials. The presence of corrosive and ionic material in the working liquid demands that all components in contact with it be highly resistant. This requirement may be satisfied by the extensive use of plastics e.g., vinyl, polyester, epoxy, etc., stainless steels, and other appropriately resistant materials.

The cost of a typical unit is in the neighborhood of $6000/100 H.P. Typically, the recovery rate is 500KBTU/hr./100 H.P., or at the present cost of energy $1.25/hr./100 H.P. For a plant with a 100 hr./week operating schedule, this results in a dollar savings of $6500/yr./100 H.P. Considering the small cost of operating the unit, the investment will be amortized in about one year, making it very desirable from an economic standpoint. This conclusion is predicated on the current cost of energy. With a mass production capability, the unit price will even be substantially reduced below the quoted figure, making the use of the present heat extractor mandatory for maximum efficiency.

EXAMPLE II

Engineering details of a facility will now be described. The outlet temperature of the working liquid is dependent on many factors. The most significant of these are the inlet temperature of the flue gas and its absolute humidity. The absolute humidity of the flue gas will in turn depend on the fuel being burned and the amount of excess air, e.g., when burning natural gas the amount of water vapor in the products of combustion is about 11%, whereas when burning #6 fuel oil that fraction is approximately 7%. To cite an example, at an installation burning #6 fuel oil and with a stack temperature of about 300° C., the working liquid was brought up to approximately 55° C. This is somewhat less than the theoretically predicted temperature. For another installation burning #6 fuel oil and with a stack temperature of about 175° C., the working liquid was brought up to a temperature of about 49° C., very close to the theoretically predicted value. This was the case because the latter reflected contact design improvements, in particular, the primary spray region. In general, the outlet temperature of the working liquid will approach the dew point (water/air) temperature achieved with the incoming gas at its initial humidity and temperature in combination with the recirculated hot working liquid. In installations employing the primary spray region, the outlet flue gas temperature is below 30° C.

EXAMPLE III

A heat extractor of the present invention was designed for usage in conjunction with the plate dryers in a fibre plant. The available heat in the exhaust gas was to be transferred to white water expressed in a previous process and intended for further use. The gas discharged from these dryers varied in temperature from about 100° C. to about 160° C., with absolute humidities in the range of 0.09 to 0.11 lb/lb.d.e. The maximum mass flow, with all dryers operating, was about 125,000 lb./hr. White water will enter at about 35° C. and is required to exit at about 45° C. at a rate of from 450 to 700 gal./min. The required heat is therefore between 5.6 million and 8.7 million BTU/hr. The heat available from the hot gas with all dryers operating was more than sufficient to accomplish this temperature rise at the 700 gal./min. rate. There is a direct correlation between the volume of entering water and the amount of hot gas. As such, the temperature rise does not vary appreciably with varying load.

The method of heat recovery used employed a direct contact scheme with countercurrent flow. The contacting unit was a vertical cylindrical tower 30 ft. high and 8 ft. diameter, overall dimensions. The white water entered through an array of spray nozzles at the top of the unit. On descending, the drops impinged on a series of vertical plates within the contacting unit. This required a pump capable of delivering a maximum of 700 gal./min. at 40 psi. The hot gas enters at the bottom of the unit, is routed through appropriate baffles to the bottom of the vertical plates and thence rise upwards, through an entrainment separator, finally being discharged through an induced draft fan at the top of the unit. In this process, the hot gas comes in contact with a falling film of water on the vertical plates, then through a spray at the top of the unit, where the water will be at its lowest temperature. The design is an efficient heat transfer mechanism which does not present any plugging problem.

To accommodate the variability of the overall load due to either taking one or more dryers off-line or to a reduction in the load of any individual dryer, the following system was developed. The pump was caused to deliver white water to the nozzles at a rate equal to its supply rate. This is done using a feedback actuated, balanced bypass arrangement with a sufficiently high turndown ratio. The draft resulting from the induced draft fan is modulated by means of variable position louvers set into the duct. The position is automatically set so as to maintain a fixed draft irrespective of load.

All wetted components in contact with the white water and gas are fabricated of SS316 or FRP appropriate to the application.

It thus will be seen that there is provided a heat extractor which achieves the various objects of the invention and which is well adapted to meet the conditions of practical use.

As various possible embodiments might be made of the above invention, and as various changes might be made in the embodiments set forth above, it is to be understood that all matter herein described or shown in the accompanying drawings is to be interpreted as illustrative and not in a limiting sense. Thus, it will be understood by those skilled in the art that although preferred and alternative embodiments have been shown and described in accordance with the Patent Statutes, the invention is not limited thereto or thereby.

Having thus described the invention, there is claimed as new and desired to be secured by Letters Patent:

1. A method of recovering usable heat from a hot stream of waste stack gas or flue gas having particulate loading and including noxious products of combustion gases including sulfur dioxide which, when exposed to cool heat exchange surfaces will produce condensed active corrosive liquids, said method comprising:
  (A) as a first heat exchange step, bringing an aqueous liquid into direct physical contact with the hot gas stream whereby to extract heat from said stream and raise the temperature of the aqueous liquid and at the same time to cleanse said stream by
    (i) dispersing the particulate loading in the aqueous liquid and
    (ii) dissolving said noxious gases in said aqueous liquid
    (iii) so that a dirty heated liquid aqueous medium and a cool cleansed gas stream are produced, and further so that the noxious gases are removed as a dilute aqueous solution thereof and in an environment such that the dilute aqueous solution of dissolved noxious gases is innocuous,
    (iv) said aqueous liquid being an aqueous solution containing a dissolved alkaline medium selected from the group consisting of the hydroxide, sulfite and carbonate of sodium, potassium, lithium and ammonia,
  (B) then as a second heat exchange step, passing the dirty heated liquid aqueous medium with dispersed particulate loading and dissolved noxious gases in indirect heat exchange with a cooler fluid working medium such as process water, potable water, boiler feed water, air for space heating, and combustion air,
  (C) whereby the dirty heated liquid aqueous medium is cooled and the cooler fluid medium is heated so that the heat from the hot gas stream by means of said two heat exchange steps raises the temperature of the fluid medium without dirtying the fluid medium and without producing corrosive liquids from said noxious gases during the second heat exchange step, and
  (D) discharging at least a fraction of the cooled dirty aqueous liquid medium to waste.

2. A method of recovering usable heat from a hot stream of waste stack gas or flue gas having particulate loading and including noxious products of combustion gases including sulfur dioxide which, when exposed to cool heat exchange surfaces will produce condensed active corrosive liquids, said method comprising:
  (A) as a first heat exchange step, bringing an aqueous liquid into direct physical contact with the hot gas stream whereby to extract heat from said stream and raise the temperature of the aqueous liquid and at the same time to cleanse said stream by
    (i) dispersing the particulate loading in the aqueous liquid and
    (ii) dissolving said noxious gases in said aqueous liquid
    (iii) so that a dirty heated liquid aqueous medium and a cool cleansed gas stream are produced, and further so that the noxious gases are removed as a dilute aqueous solution thereof and in an environment such that the dilute aqueous solution of dissolved noxious gases is innocuous,
    (iv) said aqueous liquid being an aqueous slurry containing an entrained alkaline medium selected from the group consisting of the hydroxide, sulfite and carbonate of magnesium, calcium and barium,
  (B) then as a second heat exchange step, passing the dirty heated liquid aqueous medium with dispersed particulate loading and dissolved noxious gases in indirect heat exchange with a cooler fluid working medium such as process water, potable water, boiler feed water, air for space heating, and combustion air,
  (C) whereby the dirty heated liquid aqueous medium is cooled and the cooler fluid medium is heated so that the heat from the hot gas stream by means of said two heat exchange steps raises the temperature of the fluid medium without dirtying the fluid medium and without producing corrosive liquids from said noxious gases during the second heat exchange step, and
  (D) discharging at least a fraction of the cooled dirty aqueous liquid medium to waste.

3. The method of claim 1 or 2 in which the hot stream of waste stack or flue gas is countercurrently contacted with the aqueous liquid in two stages, a first contact stage being counter-currently between a partially cooled stream of waste stack or flue gas and cold aqueous liquid, whereby a warmed aqueous liquid medium and fully cooled waste stack or flue gas are produced, a second contact stage being countercurrently between said warmed aqueous liquid medium derived from the first contact stage and the initial hot stream of waste stack or flue gas, whereby a fully heated aqueous liquid medium and said partially cooled stream of waste stack or flue gas are produced.

4. The method of claim 3 in which the first contact stage is a bed of packing through which the cold aqueous liquid flows downwards and the partially cooled gas stream flows upwards, and the second contact stage is a plurality of parallel vertically oriented passages, the warmed aqueous liquid medium flowing downwards on the inner walls of said vertically oriented passages as a thin liquid film, the initial hot gas stream flowing upwards within said vertically oriented passages.

5. The method of claim 4 in which the first and second contact stages are juxtaposed side-by-side.

6. The method of claim 4 in which the first contact stage is disposed above the second contact stage.

7. The method of claim 6 in which the first and second contact stages are both disposed in a single container.

8. The method of claim 4 in which the vertically oriented passages have a regular polygonal cross-section.

9. The method of claim 8 in which the vertically oriented passages are hexagonal.

10. The method of claim 8 in which the vertically oriented passages are aligned side-by-side in a honeycomb.

11. A method of recovering usable heat from a hot stream of waste stack gas or flue gas having particulate loading and including noxious products of combustion gases which, when exposed to cool heat exchange surfaces will produce condensed active corrosive liquids, said method comprising:
(A) as a first heat exchange step, bringing an aqueous liquid into direct physical contact with the hot gas stream whereby to extract heat from said stream and raise the temperature of the aqueous liquid and at the same time to cleanse said stream by
  (i) dispersing the particulate loading in the aqueous liquid and
  (ii) dissolving said noxious gases in said aqueous liquid
  (iii) so that a dirty heated liquid aqueous medium and a cool cleansed gas stream are produced, and further so that the noxious gases are removed as a dilute aqueous solution thereof and in an environment such that the dilute aqueous solution of dissolved noxious gases is innocuous,
(B) then as a second heat exchange step, passing the dirty heated liquid aqueous medium with dispersed particulate loading and dissolved noxious gases in indirect heat exchange with a cooler fluid working medium such as process water, potable water, boiler feed water, air for space heating, and combustion air,
(C) whereby the dirty heated liquid aqueous medium is cooled and the cooler fluid medium is heated so that the heat from the hot gas stream by means of said two heat exchange steps raises the temperature of the fluid medium without dirtying the fluid medium and without producing corrosive liquids from said noxious gases during the second heat exchange step, and
(D) discharging at least a fraction of the cooled dirty aqueous liquid medium to waste.

* * * * *